United States Patent Office 2,823,094
Patented Feb. 11, 1958

2,823,094

PROCESS OF SIMULTANEOUSLY HEAT SETTING AND PREVENTING DISCOLORATION OF NYLON TEXTILES WITH UREA, BIURET, DICYANDIAMIDE OR AMMONIUM CYANATE OPTIONALLY FOLLOWED BY TREATMENT WITH A CREASE PROOFING RESIN

Fred H. Steiger, Philadelphia, Pa., assignor to Rohm & Haas Company, Philadelphia, Pa., a corporation of Delaware No Drawing. Application March 27, 1956
Serial No. 574,066

8 Claims. (Cl. 8—115.6)

This invention relates to the treatment of nylon materials including polymers and shaped articles such as filaments, textile fabrics and the like formed therefrom for the purpose of reducing discoloration or yellowing caused by ageing at normal room temperature or by various treatments involving the application of heat to the nylon.

The term "nylon" is used in the specification and claims in its well-established meaning. It is a generic term for any long-chain synthetic polymeric amide which has recurring carbonamide groups as an integral part of the main polymer chain and which is capable of being formed into a filament in which the structural elements are oriented in the direction of its axis. The most common nylons are those obtained by condensation of diamines with dicarboxylic acids or by the auto-condensation of an amino-acid, such as initial materials generally having at least six atoms in a chain. For example, the most common specific nylon resin is that obtained by the condensation of adipic acid with hexamethylenediamine.

It is known that nylon materials now in commercial use yellow on ageing and also as a result of operations involving heating such as during ironing and in the baking or curing of stiffening, antistatic, flameproofing, waterproofing, and other finishes applied to the nylon, especially to nylon fabrics, such as those comprising heat-convertible urea-formaldehyde condensates.

Discoloration of nylon caused by ageing may be reduced by acetylation of the terminal groups by reaction with acetic anhydride, but nylon so treated has been found to yellow more easily than untreated nylon when exposed to heat.

In my prior copending application Serial No. 483,437, filed January 21, 1955, I have disclosed a process for reducing the tendency of polyamide nylon textile materials to discolor on ageing and/or heating involving the deposition of at least 5% by weight of urea, biuret, dicyandiamide or ammonium cyanate on the textile from a solution of the urea or the like, and subsequently heating the nylon carrying the deposit at a temperature of 240° F. to 450° F.

In accordance with the present invention, it has been found that such textile materials of nylon, having reduced tendency to discolor on ageing or heating, can be produced by a single step operation in which the nylon is subjected to a heated aqueous solution containing at least 15% by weight (on the bath) of a compound selected from the group consisting of urea, biuret, dicyandiamide, or ammonium cyanate.

The temperature of the aqueous solution may be from about 90° C. to 150° C., preferably at 100° C. to 120° C. at normal atmospheric pressure. The process is most conveniently carried out by refluxing the bath at ordinary pressure, but the bath need not be boiling or refluxing provided it has a temperature of at least 90° C. The nylon may be treated in such heated bath for a period of half an hour an hour or two or more, longer times being used with lower concentrations of the inhibitor. However, if higher temperatures of about 140° to 150° C. are employed, using a closed pressure vessel to attain the higher temperature, the time may be from about 10 to 15 minutes to half an hour or more.

The treatment in the aqueous solution of urea or the like serves simultaneously to set the nylon and render it resistant to shrinkage and wrinkling on laundering, and the time and temperature of the treatment may be selected to accomplish the optimum results in respect to resistance to both shrinkage and discoloration on ageing or heating.

The nylon textile may be introduced into an aqueous bath either hot or cold and the discoloration-inhibiting compound of the present invention, such as urea, may then be added until the concentration is from 15% up to saturation which may be as high as 30% to 55% or even more depending on the particular inhibitor and/or temperature used. The heating is continued for the time required at a temperature of at least 90° C. Alternatively, the inhibitor may first be dissolved to the desired concentration of at least 15% up to saturation in water either cold or hot. Then the solution may be brought up to the desired temperature, if it is not already there, and the fabric may be introduced into the solution either before or after the desired temperature of at least 90° C. is reached.

The treatment may be effected in any suitable vessel in which the nylon textile is either moved continuously or repeatedly, as in a pad or jigger, or in which the bath is agitated with or without travel of the textile, or in which the textile is held in fixed position either under tension or slightly relaxed, while the bath is moved or agitated gently to vigorously. After the treatment, the textile is rinsed; excess liquid may be removed by shaking or vibrating, squeezing, wiping, or air-squeegeeing, and then the textile may be dried either at room temperature or by subjection to heated air or by the application of radiant heat, such as by infrared lamps. It is not, however, necessary to heat the textile at 240° F. to 450° F. to effect reaction of the inhibitor with the polyamide in order to accomplish the improved resistance to discoloration on ageing or heating. After so treating the nylon materials, they may be subjected to various heat treatments such as ironing, embossing, and laundering operations without exhibiting excessive discoloration or yellowing as would be caused when such operations are applied to nylon materials which have not been treated with the inhibiting compounds of the present invention. Nylon textile materials treated in accordance with the present invention may also be provided with heat-convertible resinous finishes adapted to stiffen, crease-proof or crush-proof such textile materials without encountering the yellowing or discoloration that normally occurs when nylon textile materials without the application of inhibiting compounds of the present invention are provided with such resin-forming condensates and subjected to a baking step. For example, the heat-convertible resin-forming condensation products may be any of those of the aminoplast type such as the methylol ureas, the alkylated methylol areas obtained by the reaction of urea with formaldehyde and a lower alcohol of one to four carbon atoms, such as methanol, corresponding methylol thioureas and alkylated methylol thioureas and corresponding methylol triazines or alkylated methylol triazines of which melamine is a representative specific member. The general procedure for producing the heat-convertible aminoplast that may be applied for stiffening the nylon textile fabric may be illustrated by the following description for producing an alkylated methylol urea.

Thus, the alkylated methylol urea may be obtained by reacting a mixture of urea with formaldehyde and the particular alcohol in aqueous medium, or it may be produced by first reacting urea with formaldehyde in aqueous medium and then reacting the resulting hydrophilic condensate with a particular alcohol. In either case, the proportions between the various reactants preferably fall in definite limits. The molar ratio between the formaldehyde and urea should be at least 2:1 in moles and is preferably between 2:1 and 3:1. Higher proportions of formaldehyde may be present but are unnecessary and generally undesirable. The molar ratio of the alcohol to the urea should be between 2.5:1 and 4:1. A greater amount of alcohol may be present but is unnecessary. Conventional conditions of reaction for producing these alkylated methyol ureas may be employed. For example, the reaction between urea and formaldehyde may be effected at temperatures of 30° to 80° C. for periods of time from fifteen minutes to three quarters of an hour at a pH of 8 to 10. The reaction with the alcohol may then follow after adjusting the pH to within the range of 3 to 4.5 at temperatures of 60° to 90° C. for a time of fifteen minutes to one hour. The resulting condensate is a low molecular weight water-soluble alkylated polymethylol urea of about 75% to 90% concentration in an aqueous alcohol solution.

The application of such aminoplast stiffening agents and the curing thereof on the nylon textile material is accompanied normally by a distinct yellowing of the textile material even when the heat-convertible condensate is of the type containing urea or other compound used herein as an inhibitor of discoloration. Surprisingly, preliminary treatment of the nylon textile material with urea or the like before application of the urea-formaldehyde condensate serves to inhibit the discoloration normally obtained in the application of such stiffening finishes to the textile fabric without decreasing the stiffening effect of the aminoplast finish. It has been found that the introduction of free urea in the aminoplast composition tends to decrease the yellowing produced but also substantially reduces the stiffening effect obtainable. It has also been found that the pre-treatment with discoloration inhibitors of the present invention produces no noticeable reduction in strength of the nylon materials.

It is believed that the inhibitor reacts with terminal amine groups in the nylon materials during the baking or curing operation just mentioned. It appears that the swelling action of the water at the elevated temperature aids in the action of the inhibitor, such as urea. However, it is not intended to be limited to any particular theory of operation.

The treatment with the inhibitor of the invention may be applied to unshaped nylon material or it may be applied to shaped or formed articles of all types, such as fibers, filaments, yarns, cords, textile fabrics woven, knitted or otherwise formed from fibers, filaments or yarns of the nylon material, or it may be applied to films, pellicles, sheets or more massive formed bodies of the nylon.

The application of the discoloration inhibitors also modifies the dyeing properties of the nylon. This property may be used to advantage when it is desired to reduce the intensity of the dyeing with acid dyes. For example, when cross-dyeing effects are desired on wool-nylon blends, the nylon fibers, filaments, or yarns may be pre-treated with the urea or other discoloration-inhibitors before blending with wool fibers in a spinning operation or with wool yarns in a weaving, knitting, or other fabric-making operation respectively. The nylon-wool fabric may then be dyed with a wide variety of acid dyes which dye the wool to a deep shade without dyeing the nylon or with only a slight dyeing of the nylon.

In the following examples, which are illustrative of the invention, the parts and percentages are by weight unless otherwise stated:

Example 1

(a) A scoured nylon taffeta in dry condition is immersed in a 25% solution of urea in water and the bath is heated half an hour at refluxing temperature. Another similar sample is treated in the same way except the treatment is prolonged to a full hour. Two other similar samples are treated in a 50% solution of urea at reflux, one for half an hour and the other for a full hour. Then the fabrics are thoroughly rinsed in water to remove unreacted urea, and air-dried. A control nylon taffeta treated identically but omitting urea from the solution is also prepared. Each of the fabrics is then heated at 150° C. until a slight pre-determined discoloration is attained. The following table gives the time in minutes required by each fabric to attain the same slight discoloration.

| Fabric treatment: | Time in minutes |
|---|---|
| Water, ½ hour | 120 |
| Water, 1 hour | 72 |
| 25% urea, ½ hour | 160 |
| 25% urea, 1 hour | 210 |
| 50% urea, ½ hour | 260 |
| 50% urea, 1 hour | 310 |

(b) The procedure of part (a) is repeated except the concentration of the urea is 15% and the time of treatment is 2½ hours. The time required for the aforesaid discoloration is about 300 minutes.

Example 2

The procedure of Example 1 is repeated substituting ammonium cyanate for the urea in one set of runs, dicyandiamide for the urea in another, and biuret in another. Generally comparable results are obtained.

Example 3

(a) A reaction vessel is charged with 96 parts of methanol, 18 parts of an aqueous 36.3% formaldehyde solution, and 78.5 parts of 91% paraformaldehyde flake. The mixture is adjusted to a pH of 8.5 with 10% sodium hydroxide solution and gently heated at reflux until it becomes clear. Urea is added in an amount of 60 parts, the pH of the mixture is readjusted, and the mixture is then heated at 70° to 75° C. for 20 minutes. The mixture is treated with a solution of phosphoric acid in methanol to a pH of about 3.5 and heated under reflux for 15 minutes. The mixture is cooled to 55° C. Alkali solution is added to bring the pH to 7.2 and the mixture heated under reduced pressure to remove the bulk of volatile materials. The product is a clear, practically colorless syrup having a viscosity of G on the Gardner-Holdt scale. It has a specific gravity of 1.22 and is miscible with water in all proportions.

(b) Eight parts by weight of the heat-convertible syrup obtained in the preceding paragraph is introduced into 91.5 parts by weight of water and then 0.5% of ammonium chloride is added. A nylon taffeta pre-treated with 50% aqueous urea for one hour at reflux in Example 1(a) is padded through the resulting solution of the methylated methylol urea, air-dried and then cured at 300° F. for 10 minutes. Less discoloration of the fabric is observed than that of a control fabric treated by part (b) hereof without the pre-treatment with urea. When the curing of the urea-pre-treated fabric and the control was extended to a period of one hour, the urea-treated fabric showed only slightly more discoloration whereas the control fabric was markedly further discolored.

Example 4

A nylon taffeta is treated with 50% aqueous urea for one hour at reflux by the procedure of Example 1(a). Then a solution containing 16 parts of a heat-convertible methylated methylol melamine condensate and 0.5 part of ammonium chloride in water was applied to the treated nylon in a textile pad. The fabric was then air-dried and cured at 300° F. for ten minutes. The reduced discoloration obtained was similar to that obtained in Example 2(b) with the 10-minute curing period. When curing was extended to one hour, the control fabric was even more discolored than the control in Example 2(b) when cured one hour whereas the urea-pre-treated fabric was comparable to the urea-pre-treated fabric of Example 2(b) cured one hour.

It is to be understood that changes and variations may be made without departing from the spirit and scope of the invention as defined in the appended claims.

I claim:

1. A process for treating a textile material of a water-insoluble long-chain synthetic polymeric amide having recurring carbonamide groups as an integral part of the main polymer chain to reduce discoloration thereof on ageing and heating comprising heating the material for a period of at least one-half hour in an aqueous solution containing dissolved therein at least 15% of a solute consisting exclusively of at least one compound selected from the group consisting of urea, biuret, dicyandiamide, and ammonium cyanate at a temperature of about 90° to 150° C.

2. A process for treating a textile material of a water-insoluble long-chain synthetic polymeric amide having recurring carbonamide groups as an integral part of the main polymer chain to reduce discoloration thereof on ageing and heating comprising heating the material for a period of at least one-half hour in an aqueous solution containing dissolved therein at least 15% of a solute consisting exclusively of at least one compound selected from the group consisting of urea, biuret, dicyandiamide, and ammonium cyanate at a temperature of about 90° to 120° C.

3. A process for treating a textile material of a water-insoluble long-chain synthetic polymeric amide having recurring carbonamide groups as an integral part of the main polymer chain to reduce discoloration thereof on ageing and heating comprising heating the material for a period of at least one-half hour in an aqueous solution containing dissolved therein at least 15% of a solute consisting exclusively of at least one compound selected from the group consisting of urea, biuret, dicyandiamide, and ammonium cyanate at a temperature of about 90° to 150° C., removing the textile material from the aqueous solution, and subsequently applying to the textile material a heat-convertible resin-forming aminoplast condensate selected from the group consisting of urea-formaldehyde condensates having a formaldehyde to urea molar ratio of at least 2:1, melamine-formaldehyde condensates, and thiourea-formaldehyde condensates and their alkylation products obtained from alcohols having from 1 to 4 carbon atoms, and baking the textile carrying such condensate at a temperature of 240° F. to 450° F.

4. A process for treating a textile material of a water-insoluble long-chain synthetic polymeric amide having recurring carbonamide groups as an integral part of the main polymer chain to reduce discoloration thereof on ageing and heating comprising heating the material for a period of at least one-half hour in an aqueous solution containing dissolved therein at least 15% of a solute consisting exclusively of urea at a temperature between about 90° to 150° C.

5. A process for treating a textile material of a water-insoluble long-chain synthetic polymeric amide having recurring carbonamide groups as an integral part of the main polymer chain to reduce discoloration thereof on ageing and heating comprising heating the material for a period of at least one-half hour in an aqueous solution containing dissolved therein at least 15% of a solute consisting exclusively of biuret at a temperature between about 90° to 150° C.

6. A process for treating a textile material of a water-insoluble long-chain synthetic polymeric amide having recurring carbonamide groups as an integral part of the main polymer chain to reduce discoloration thereof on ageing and heating comprising heating the material for a period of at least one-half hour in an aqueous solution containing dissolved therein at least 15% of a solute consisting exclusively of dicyandiamide at a temperature between about 90° to 150° C.

7. A process for treating a textile material of a water-insoluble long-chain synthetic polymeric amide having recurring carbonamide groups as an integral part of the main polymer chain to reduce discoloration thereof on ageing and heating comprising heating the material for a period of at least one-half hour in an aqueous solution containing dissolved therein at least 15% of a solute consisting exclusively of ammonium cyanate at a temperature between about 90° to 150° C.

8. A process for treating a fabric comprising yarns of a water-insoluble long-chain synthetic polymeric amide having recurring carbonamide groups as an integral part of the main polymer chain to reduce discoloration thereof on ageing and heating comprising heating the fabric while it is held under tension for a period of at least about one-half hour in an aqueous solution containing dissolved therein at least 15% of a solute consisting exclusively of at least one compound selected from the group consisting of urea, biuret, dicyandiamide, and ammonium cyanate at a temperature of about 90° to 150° C.

References Cited in the file of this patent

UNITED STATES PATENTS

| 2,458,397 | MacGregor | Jan. 4, 1949 |
| 2,577,957 | Farnsworth | Dec. 11, 1951 |

FOREIGN PATENTS

| 547,844 | Great Britain | Sept. 14, 1942 |